Dec. 12, 1967  P. B. FONDEN  3,357,368
ARRANGEMENT IN TRANSPORT SYSTEMS FOR
CONNECTING TRUCKS OR THE LIKE
Filed Sept. 27, 1965
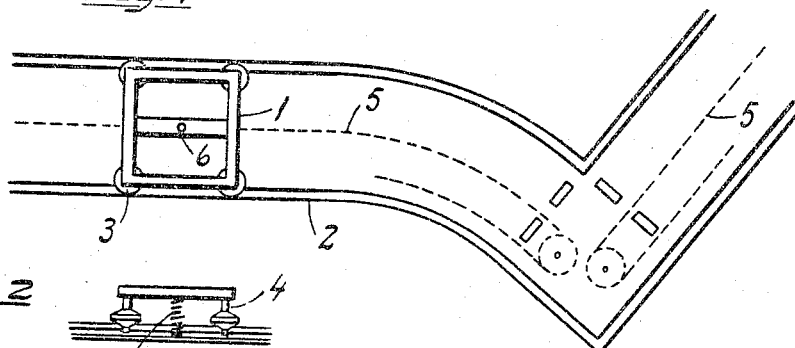
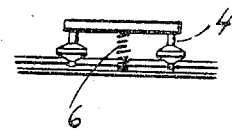
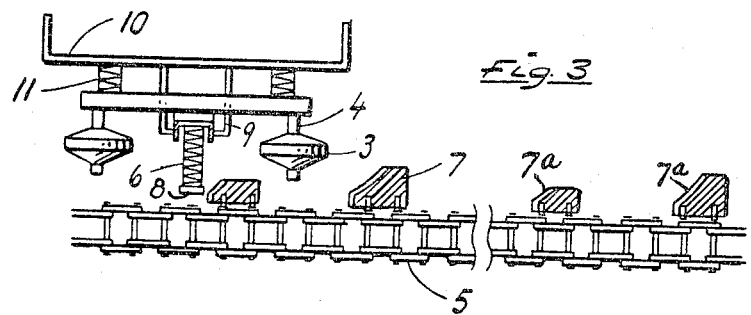
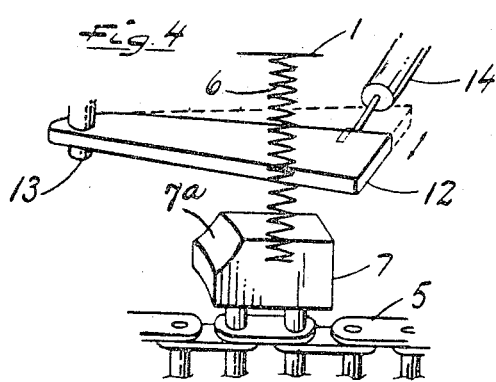
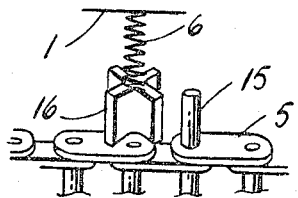
INVENTOR.
PER BORJE FONDEN
BY
Eric Y. Munson
ATTORNEY

# United States Patent Office 3,357,368
Patented Dec. 12, 1967

3,357,368
ARRANGEMENT IN TRANSPORT SYSTEMS FOR CONNECTING TRUCKS OR THE LIKE
Per Borje Fonden, Linkoping, Sweden, assignor to Borgs Fabriks, AB, Norrkoping, Sweden
Filed Sept. 27, 1965, Ser. No. 490,459
Claims priority, application Sweden, Sept. 29, 1964, 11,673/64
6 Claims. (Cl. 104—172)

ABSTRACT OF THE DISCLOSURE

A driving arrangement for trucks which are moved along on tracks, the driving means including driven chains and a resilient driver carried by the truck, the driver in its simplest form consisting of a resilient coil spring which can be flexed equally in all directions in the plane of the track. Blocks provided on the chain are engaged by the flexible driver and are suitably shaped so that when the driver encounters a resistance it will spring away from the block engaged by it and thus release the truck from its driving connection to the chain.

---

The invention relates to an arrangement in transport systems for connecting trucks or the like, guided along tracks, to a driving device, such as a chain arranged along the track. The invention is principally characterized in that the truck is provided with a driving means, herein referred to as a driver, that is resilient at least in the direction of movement, which driver is arranged to yield when subjected to a certain resistance and release the truck from the driving means.

Such a driving arrangement solves the problem of transferring, by means of spring-force, a driving force to a truck moving on tracks in a plurality of directions and, moreover, it permits a simple control of the driving force and the maximum force with which the truck resists the driving force, such as before a stop. The arrangement also permits acceleration to be regulated, for example, when the truck is first set in motion, and provides for a flexibility in use, making it especially suitable for driving transport trucks in a system intended for movement in several directions.

With the above object and other objects to be hereinafter set forth in view, I have devised the arrangement of parts to be described and more particularly pointed out in the claims appended hereto.

In the accompanying drawing, wherein an illustrative embodiment of the invention is disclosed, FIG. 1 shows a track with a truck on it and viewed from above;

FIG. 2 shows the truck and a section of the track seen in FIG. 1 and viewed from the side;

FIG. 3 shows a portion of the truck and a driver seen from the side;

FIG. 4 shows in perspective, a member for releasing the driver from the driving member, and FIG. 5 shows in perspective a modified driver arrangement.

The invention is illustrated in the accompanying drawing in which a truck 1 is shown on a track 2 provided with a straight section, a curve and an angle-track. The wheels 3 of the truck, together with shafts 4, are arranged at right angles to the plane of the track in a manner known per se for the purpose of permitting movement at right angles to the same.

At 5 is shown a driving device, in this case a chain. The center of the carriage is provided with a downwardly directed, resilient driver 6, consisting in its simplest form, of a coil spring securely clamped to the frame of the truck, which spring, by virtue of its rotational symmetry, can be flexed equally in all directions in the plane of the track. As is seen in FIG. 2, said spring is in engagement with the chain 5 on which blocks 7 are arranged either singly or in groups. The blocks are cut away at their front end as shown at 7a and thus prevent the driver from being moved to one side and past the blocks.

By means of driving devices positioned along the track it is possible, using this arrangement, to move the trucks along the track into curves and right-angle deviations. When subjected to a certain force, determined by the shape of the driver block and the length and rigidity of the resilient driver, the driver flexes, passing the driver block if this force is too great. The force, as a function of the spring-back action, can easily be regulated to the required extent by varying the shape of the block, which force characteristic can be further varied by supplying the driver with special members such as a protruding flange 8.

As was stated above, this arrangement also permits the driver-blocks to function in groups. By the described means the start of a heavy truck for example, can be somewhat accelerated by the first driver in a group. The force characteristic in this case is arranged so that the block passes the driver due to the backward springing of the driver. The spring 6 quickly makes contact with the next driver-block increasing the speed of the truck, this action being possibly repeated by a third driver-block etc. until its mass-force has been overcome and the truck is carried by one of the driver-blocks in the group.

The blocks, separate or in groups, can be given various forms for the purpose of further increasing the possibility of varying the force characteristics with the intention of achieving the most suitable for the problem involved.

The described arrangement can offer other advantages for example, by providing trucks of different weight, in the same system, with drivers of different lengths and rigidity, thus enabling the start-up procedure for different trucks, included in one and the same track system, to be varied. This variation can also be seen in FIG. 3, by providing the coil spring 6 secured to the chassis of the truck, with a sleeve 9. This sleeve is mechanically connected to the bottom 10 of the truck resting on a number of compression springs 11 so dimensioned that when the truck is unloaded they hold the bottom of the truck, and thereby the sleeve, raised a little in relation to the chassis of the truck. When the truck is loaded, the sleeve is pushed down, the resilient portion of the driver being shortened and thereby the force to be overcome before the driver can be bent over to a driver-block, is increased. A lateral stiffening pin can be located in the spring 6 as an alternative for the sleeve.

Since the desired acceleration of the truck can thus be controlled and regulated by the described means, and since the system is not limited to only one driver-block, the acceleration distance obtainable can be selected of arbitrary length and thus choice of suitable acceleration or force be, without restriction, chosen wholly in accordance with that suitable with respect to prevailing conditions.

Although only one method, illustrating how the spring force is simply, and in this case automatically, adapted according to prevailing conditions, has been described the inventive idea also embraces the many ways in which the rigid flexibility of the driver arrangement permits itself to be varied.

Other advantages can also be gained by means of this arrangement. For example, if a truck should be stopped, the driving force can be simultaneously disconnected in a very simple manner by means of a cam plate 12, as shown in FIG. 4, over the driver. This plate is so designed that the driver, by sliding along the edge of the plate, is forced sidewise out of the front cutaway portion 7a of the driver-block 7. If said cam is made movable about a shaft 13 by for example, being connected to a reciprocating force-member 14 such as an air cylinder, the driving force can be simply disconnected from a truck approaching a switching station intended for right-angle movement to the side whereas, for example, the next approaching truck, intended to move straight onwardly, is kept supplied with said driving force for the entire time. This simple method of individually disconnecting the driving-force enables a completely regulated retardation of speed until all motion ceases, something which otherwise is particularly difficult to achieve in any type of driver where the force presents large variations on a resilient member overcoming the driving force. For example, retardation can be accomplished by allowing the driver to be slid along a friction path, arranged on the side of the chain, until the truck stops. Similarly, the device can be used for switching from one drive-section to another.

By means of the arrangement of driving blocks, provided with hollowed-out portions at their forward ends, an automatic centering is obtained, even if the driver and the track follow curves. Also, centering can be achieved in an even simpler manner by providing the driving means with upwardly-projecting pins 15 which can be easily done with many different types of chains, and the resilient driver with a correspondingly-sectioned cross-shaped portion 16, as seen in FIG. 5. This arrangement also permits the pins to be arranged in groups.

Since the advantages of the described system is in its various forms variable according to different requirements, it is obvious that the complete range of such variations cannot be described in detail.

Automatic regulation of the spring force and insertion of resilient or shock-absorbing members also into the driving member is conceivable. Although the arrangement described mentions one driver situated centrally on the truck there is nothing to prevent the driver from being placed eccentrically in relation to the truck or that more than one driver be arranged on the same. Neither is there anything to hinder the driver from being arranged horizontally, directed upwardly, or in general adapted to those conditions most suitable for the individual situation.

Having described an embodiment of the invention, it is obvious that the same is not to be restricted thereto, but is broad enough to cover all structures coming within the scope of the annexed claims.

What I claim is:

1. An arrangement in transport systems for connecting trucks that are guided along tracks, to a driving device, said device including a chain arranged along the track, the truck being provided with a driver that consists of a coil spring movable in a number of directions, said driver being so arranged that upon encountering a resistance it will spring away from its engagement with the chain and thus release the truck from its drive connection to the chain, and a projection on the chain normally engaged by the driver until the driver encounters said obstruction.

2. An arrangement according to claim 1, characterized in that the driver is secured to the chassis of the truck which resiliently supports a truck-bottom having a laterally stiffening member in the form of a sleeve located around the spring.

3. An arrangement according to claim 2 in which the stiffening member is a pin in the spring instead of a sleeve around it.

4. An arrangement in transport systems for connecting trucks that are guided along tracks, to a driving device, said device including a chain arranged along the track, a projection on the chain, a truck on the track, said truck being provided with a driver that is resilient in at least two directions opposed at right angles to each other, the driver being provided at its free end with a member that is cross-shaped in cross section, for engagement with the projection located on the chain.

5. An arrangement according to claim 4, wherein the projection is located on the truck.

6. An arrangement in transport systems for connecting trucks that are guided along tracks, to a driving means which includes a chain arranged along the track, a truck on the track, a block on the chain, said block having a hollowed-out face, the truck being provided with a flexible driver in the form of a coil spring, said driver being adapted for engagement by the hollowed-out face of the block to thereby establish a driving connection between the chain and the truck, said driver being arranged, on encountering a predetermined resistance to spring away from its engagement with the block and thus release the truck from its driven relationship to the chain.

References Cited

UNITED STATES PATENTS

| | | | |
|---|---|---|---|
| 1,792,533 | 2/1931 | Francis | 104—25 |
| 3,091,191 | 5/1963 | Fur | 104—172 |
| 3,126,838 | 3/1964 | Bradt | 104—172 X |
| 3,130,685 | 4/1964 | Goodrich et al. | 104—172 |
| 3,229,645 | 1/1966 | Dehne | 104—96 X |
| 3,255,710 | 6/1966 | Bradshaw et al. | 104—162 |

FOREIGN PATENTS 601,719   5/1948   Great Britain.

ARTHUR L. LA POINT, *Primary Examiner.*

J. E. BABER, *Assistant Examiner.*